(12) United States Patent
Liu et al.

(10) Patent No.: US 11,695,334 B2
(45) Date of Patent: Jul. 4, 2023

(54) SWITCHED CAPACITOR CONVERTER MODE TRANSITION CONTROL METHOD

(71) Applicant: NuVolta Technologies (Shanghai) Co., Ltd., Shanghai (CN)

(72) Inventors: Cheng Liu, Shanghai (CN); Fuchun Zhan, Shanghai (CN); Yushi Liu, Shanghai (CN)

(73) Assignee: NuVolta Technologies (Shanghai) Co., Ltd., Shanghai (CN)

( * ) Notice: Subject to any disclaimer, the term of this patent is extended or adjusted under 35 U.S.C. 154(b) by 140 days.

(21) Appl. No.: 17/506,813

(22) Filed: Oct. 21, 2021

(65) Prior Publication Data
US 2023/0097692 A1 Mar. 30, 2023

(30) Foreign Application Priority Data
Sep. 30, 2021 (CN) .......................... 202111159584.3

(51) Int. Cl.
*H02M 3/07* (2006.01)
*H02M 3/158* (2006.01)

(52) U.S. Cl.
CPC ........... *H02M 3/072* (2021.05); *H02M 3/158* (2013.01)

(58) Field of Classification Search
CPC ...... H02M 3/072; H02M 3/158; H02M 3/077; H02M 3/073
See application file for complete search history.

(56) References Cited

U.S. PATENT DOCUMENTS

| | | | | |
|---|---|---|---|---|
| 5,912,552 A | * | 6/1999 | Tateishi .............. | H02M 3/1588 323/224 |
| 2008/0101102 A1 | * | 5/2008 | Lipcsei .................. | H02M 1/36 363/74 |

* cited by examiner

*Primary Examiner* — Adolf D Berhane
*Assistant Examiner* — Afework S Demisse
(74) *Attorney, Agent, or Firm* — Li Li; AP3 Law Firm PLLC

(57) ABSTRACT

A method includes configuring a switched capacitor converter to operate in a first fixed PWM mode, wherein in the first fixed PWM mode, the switched capacitor converter is configured to charge a battery coupled to an input of the switched capacitor converter, configuring the switched capacitor converter to operate in a second fixed PWM mode, wherein in the second fixed PWM mode, the switched capacitor converter is configured to discharge the battery, and configuring the switched capacitor converter to operate in a skip mode, wherein the switched capacitor converter has automatic transitions among different modes based on comparisons between an output voltage of the switched capacitor converter and a plurality of predetermined voltage thresholds.

20 Claims, 7 Drawing Sheets

SWITCHED CAPACITOR CONVERTER MODE TRANSITION CONTROL METHOD

PRIORITY CLAIM

This application claims priority to Chinese Patent Application No. 202111159584.3 filed on Sep. 30, 2021, which is hereby incorporated by reference in its entirety.

TECHNICAL FIELD

The present invention relates to a battery charging apparatus and control method, and, in particular embodiments, to a switched capacitor converter mode transition control apparatus and method.

BACKGROUND

As technologies further advance, a variety of electronic devices, such as mobile phones, tablet PCs, digital cameras, MP3 players and/or the like, have become popular. Each portable device may employ a plurality of rechargeable battery cells. The plurality of rechargeable battery cells may be connected in series or in parallel so as to form a rechargeable battery pack for storing electrical energy.

Battery chargers are employed to restore energy to the batteries. A battery charger is controlled to provide voltage (e.g., a constant voltage charging mode) and current (e.g., a constant current charging mode) to a battery so as to restore energy to the battery.

There may be a variety of power conversion topologies suitable for charging batteries. In accordance with the topology difference, the power conversion topologies can be divided into three categories, namely, switching power converters, linear regulators and switched-capacitor power converters. In comparison with other topologies, the switched capacitor converters are less complicated because the switched capacitor converters are formed by a plurality of switches and a flying capacitor. As a result, the switched-capacitor converters can provide compact and efficient power for charging batteries.

In a dual-cell battery application, a bidirectional charge pump (e.g., a dual-phase switched capacitor converter) is employed as a charger for charging the dual-cell battery. A switching charger and the bidirectional charge pump are coupled between an ac/dc adapter and the dual-cell battery. The bidirectional charge pump operates in a 1:2 charge mode when the ac/dc adapter is present and the dual-cell battery is not fully charged. The bidirectional charge pump operates in a 2:1 discharge mode for powering the system load when the ac/dc adapter is absent, or the ac/dc adapter is present but stops charging the dual-cell battery.

In the 1:2 charge mode, in order to stably charge the battery, the bidirectional charge pump is configured to operate at a fixed pulse-width modulation (PWM) mode. In the 2:1 discharge mode, the bidirectional charge pump is configured to operate at a skip mode in a light load operating condition to achieve better conversion efficiency and extend the battery life. In the 2:1 discharge mode, the bidirectional charge pump may leave the skip mode and enter into a fixed PWM mode for reducing the output ripple when the system load is heavy.

As discussed above, the bidirectional charge pump is able to operate in two different modes including the 1:2 charge mode and the 2:1 discharge mode. The 2:1 discharge mode further comprises a skip mode and a fixed PWM mode. It would be desirable to configure the bidirectional charge pump to have a seamless transition between different operating modes. The present disclosure addresses this need.

SUMMARY

These and other problems are generally solved or circumvented, and technical advantages are generally achieved, by preferred embodiments of the present disclosure which provide a switched capacitor converter mode transition control apparatus and method.

In accordance with an embodiment, a method comprises configuring a switched capacitor converter to operate in a first fixed PWM mode, wherein in the first fixed PWM mode, the switched capacitor converter is configured to charge a battery coupled to an input of the switched capacitor converter, configuring the switched capacitor converter to operate in a second fixed PWM mode, wherein in the second fixed PWM mode, the switched capacitor converter is configured to discharge the battery, and configuring the switched capacitor converter to operate in a skip mode, wherein the switched capacitor converter has automatic transitions among different modes based on comparisons between an output voltage of the switched capacitor converter and a plurality of predetermined voltage thresholds.

In accordance with another embodiment, a method comprises coupling an input of a switched capacitor power converter to a battery and an output of the switched capacitor power converter to a system load and a charger, configuring the switched capacitor converter to operate in a 1:2 fixed PWM mode to charge the battery, configuring the switched capacitor converter to operate in a 2:1 fixed PWM mode to discharge the battery, and configuring the switched capacitor converter to operate in a 2:1 skip mode in a light load operating condition, wherein the switched capacitor converter has automatic transitions among different modes based on comparisons between an output voltage of the switched capacitor converter and a plurality of predetermined voltage thresholds.

In accordance with yet another embodiment, a controller comprises a first comparator configured to compare an output voltage of a switched capacitor power converter with a first fixed PWM mode threshold voltage, wherein the first fixed PWM mode threshold voltage is greater than one half of an input voltage of the switched capacitor power converter, a second comparator configured to compare the output voltage of the switched capacitor power converter with a skip mode threshold voltage, a third comparator configured to compare the output voltage of the switched capacitor power converter with a threshold voltage for initializing a skip mode, a fourth comparator configured to compare the output voltage of a switched capacitor power converter with a second fixed PWM mode threshold voltage, wherein the second fixed PWM mode threshold voltage is less than the one half of an input voltage of the switched capacitor power converter and a fifth comparator configured to compare a current flowing through the switched capacitor power converter with a predetermined sink current for determining whether the switched capacitor power converter enters into the skip mode under a light load operating condition.

The foregoing has outlined rather broadly the features and technical advantages of the present disclosure in order that the detailed description of the disclosure that follows may be better understood. Additional features and advantages of the disclosure will be described hereinafter which form the subject of the claims of the disclosure. It should be appreciated by those skilled in the art that the conception and specific embodiment disclosed may be readily utilized as a basis for modifying or designing other structures or processes for carrying out the same purposes of the present disclosure. It should also be realized by those skilled in the art that such equivalent constructions do not depart from the spirit and scope of the disclosure as set forth in the appended claims.

BRIEF DESCRIPTION OF THE DRAWINGS

For a more complete understanding of the present disclosure, and the advantages thereof, reference is now made to the following descriptions taken in conjunction with the accompanying drawings, in which.

Corresponding numerals and symbols in the different figures generally refer to corresponding parts unless otherwise indicated. The figures are drawn to clearly illustrate the relevant aspects of the various embodiments and are not necessarily drawn to scale.

DETAILED DESCRIPTION OF ILLUSTRATIVE EMBODIMENTS

The making and using of the presently preferred embodiments are discussed in detail below. It should be appreciated, however, that the present disclosure provides many applicable inventive concepts that can be embodied in a wide variety of specific contexts. The specific embodiments discussed are merely illustrative of specific ways to make and use the disclosure, and do not limit the scope of the disclosure.

The present disclosure will be described with respect to preferred embodiments in a specific context, namely a switched capacitor converter mode transition control apparatus and method. The disclosure may also be applied, however, to a variety of power converters. Hereinafter, various embodiments will be explained in detail with reference to the accompanying drawings.

Figure 1:
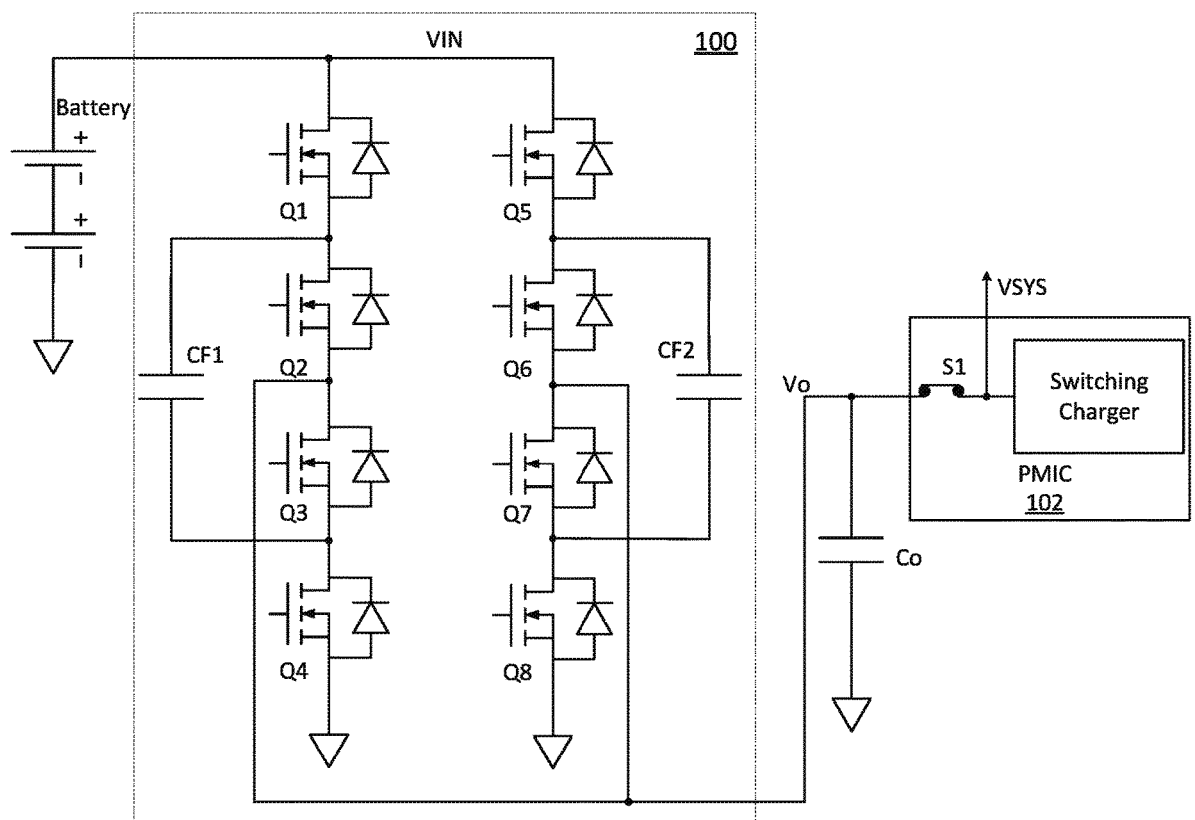
FIG. 1 illustrates a schematic diagram of a battery charging system in accordance with various embodiments of the present disclosure.

FIG. 1 illustrates a schematic diagram of a battery charging system in accordance with various embodiments of the present disclosure. The battery charging system includes a dual-phase switched capacitor power converter 100 and a power management integrated circuit (PMIC) 102. As shown in FIG. 1, the input of the dual-phase switched capacitor power converter 100 is connected to a battery. The input voltage bus to which the dual-phase switched capacitor power converter 100 and the battery are coupled is denoted as VIN.

In some embodiments, the battery may be implemented as a multi-cell battery. In the present disclosure, the battery is a dual-cell battery as shown in FIG. 1.

The output of the dual-phase switched capacitor power converter 100 is connected to an output voltage bus Vo. An output capacitor Co is connected between Vo and ground. The output voltage bus Vo is connected to a switching charger of the PMIC 102 through a switch S1. In some embodiments, S1 is a power switch. As shown in FIG. 1, the output of the switching charger of the PMIC 102 and a system load VSYS are also connected together. The switching charger of the PMIC 102 may be implemented as any suitable charger such as a buck switching charger. The input of the buck switching charger may be coupled to a power source such as an ac/dc adapter. The output of the buck switching charger is connected to Vo through S1. When the ac/dc adapter is connected to the battery charging system, the PMIC 102 (e.g., buck switching charger) is configured to provide power for charging the battery through the dual-phase switched capacitor power converter 100.

The dual-phase switched capacitor power converter 100 comprises two legs. A first leg comprises a first switch Q1, a second switch Q2, a third switch Q3 and a fourth switch Q4 connected in series between the input voltage bus VIN and ground. A first flying capacitor CF1 is connected between a common node of Q1 and Q2, and a common node of Q3 and Q4. A second leg comprises a fifth switch Q5, a sixth switch Q6, a seventh switch Q7 and an eighth switch Q8 connected in series between the input voltage bus VIN and ground. A second flying capacitor CF2 is connected between a common node of Q5 and Q6, and a common node of Q7 and Q8. As shown in FIG. 1, a common node of Q2 and Q3 is connected to the output voltage bus Vo. A common node of Q6 and Q7 is also connected to the output voltage bus Vo. Throughout the description, the dual-phase switched capacitor power converter 100 may be alternatively referred to as a switched capacitor converter.

In operation, the operating principle of the first leg is similar to that of the second leg except that the drive signals of the first leg (e.g., Q1) and the drive signals of the second leg (e.g., Q5) are 180 degrees out of phase from each other. For simplicity, only the operating principle of the first leg is described below in detail.

In operation, the first leg of the switched capacitor converter 100 is configured to operate in two different phases. During the first phase, switches Q1 and Q3 are turned on, and switches Q2 and Q4 are turned off. Since switches Q1 and Q3 are turned on, a first conductive path is established between VIN and Vo. The first conductive path is formed by switch Q1, the first flying capacitor CF1 and switch Q3. The current flows from VIN to Vo through the first conductive path. During the first phase, the first flying capacitor CF1 is charged and energy is stored in the first flying capacitor CF1 accordingly.

During the second phase, switches Q1 and Q3 are turned off, and switches Q2 and Q4 are turned on. Since switches Q2 and Q4 are turned on, a second conductive path is established. The second conductive path is formed by switch Q4, the first flying capacitor CF1 and switch Q2. During the second phase, the current discharges the first flying capacitor CF1 and the energy stored in the first flying capacitor CF1 decreases accordingly.

The operating principle above is based on a 2:1 fixed PWM mode. The two phases of the 1:2 fixed PWM mode are similar to the two phases of the 2:1 fixed PWM mode, and hence are not discussed herein again to avoid repetition.

In accordance with an embodiment, the switches of FIG. 1 (e.g., switches Q1-Q8) may be metal oxide semiconductor field-effect transistor (MOSFET) devices, bipolar junction transistor (BJT) devices, super junction transistor (SJT) devices, insulated gate bipolar transistor (IGBT) devices, gallium nitride (GaN) based power devices and/or the like.

It should be noted while FIG. 1 shows the switches Q1-Q8 are implemented as single n-type transistors, a person skilled in the art would recognize there may be many variations, modifications and alternatives. For example, depending on different applications and design needs, at least some of the switches Q1-Q8 may be implemented as p-type transistors. Furthermore, each switch shown in FIG. 1 may be implemented as a plurality of switches connected in parallel. Moreover, a capacitor may be connected in parallel with one switch to achieve zero voltage switching (ZVS)/zero current switching (ZCS).

A controller (not shown but illustrated in FIG. 2) is configured to generate gate drive signals for switches Q1-Q8. Furthermore, the controller is configured to detect a plurality of operating parameters including the input voltage on the input voltage bus VIN, the output voltage on the output voltage bus Vo, the current flowing through the first leg and the current flowing through the second leg. Based on the detected operating parameters, the controller is able to determine the operating mode of the switched capacitor converter 100.

The operating modes of the switched capacitor converter 100 include a 1:2 fixed PWM mode, a 2:1 fixed PWM mode and a 2:1 skip mode. The switched capacitor converter 100 functions as a bidirectional charge pump. When a power source is connected to the output voltage bus Vo, the switched capacitor converter 100 converts the voltage on Vo into a higher voltage. In particular, the output voltage (voltage on VIN) is twice the input voltage (voltage on Vo). Under this configuration, the switched capacitor converter 100 operates in the 1:2 fixed PWM mode. In the present disclosure, when a power source (e.g., an ac/dc adaptor) is connected to Vo through the PMIC 102, the switched capacitor converter 100 is configured to operate in the 1:2 fixed PWM mode to charge the battery.

On the other hand, when the battery functions as a power source, the switched capacitor converter 100 converts the voltage on VIN into a lower voltage. In particular, the output voltage (voltage on Vo) is equal to one half of the input voltage (VIN/2). Under this configuration, the switched capacitor converter 100 operates in the 2:1 fixed PWM mode. In the present disclosure, when a power source (e.g., an ac/dc adaptor) is not connected to the battery charging system, the switched capacitor converter 100 is configured to operate in the 2:1 fixed PWM mode to provide power for the system load.

Furthermore, the switched capacitor converter 100 may operate in the 2:1 skip mode to reduce switching losses. In the 2:1 fixed PWM mode, the switched capacitor converter 100 may operate at a fixed switching frequency (e.g., 500 KHz). In order to reduce switching losses in a light load operating condition, the controller may skip unneeded switching clock pulses while at the same time regulate the output voltage. For example, in the skip mode, a new cycle is initiated when the output voltage drops below a predetermined threshold. As a result of skipping unneeded switching clock pulses, the switching frequency of the skip mode is lower than the fixed switching frequency.

It should be noted that the battery charging system shown in FIG. 1 is provided for illustrative purposes only, and is provided only as an example of the functionality that may be included in the battery charging system. One of ordinary of skill in the art will realize that the battery charging system may include other necessary components. For example, for protecting the battery, an isolation switch (not shown) may be connected between the battery and a power source (e.g., a direct charging adapter) providing power for charging the battery. The isolation switch is formed by two back-to-back connected switches. The isolation switch is able to provide reverse blocking capability to isolate the battery from the power source.

In operation, the switched capacitor converter 100 is configured to operate in a first fixed PWM mode. The first fixed PWM mode is a 1:2 fixed PWM mode. In the first fixed PWM mode, the switched capacitor converter 100 is configured to charge the battery coupled to VIN.

In operation, the switched capacitor converter 100 is configured to operate in a second fixed PWM mode. The second fixed PWM mode is a 2:1 fixed PWM mode. In the second fixed PWM mode, the switched capacitor converter 100 is configured to discharge the battery.

In operation, the switched capacitor converter 100 is configured to operate in a skip mode. The skip mode is a 2:1 skip mode. In particular, the switched capacitor converter 100 operates in the 2:1 skip mode in a light load operating condition.

In operation, the switched capacitor converter 100 is capable of having automatic transitions among different modes based on comparisons between an output voltage of the switched capacitor converter and a plurality of predetermined voltage thresholds. The detailed operating principle of the switched capacitor converter 100 will be discussed below with respect to FIGS. 2-6.

Figure 2:
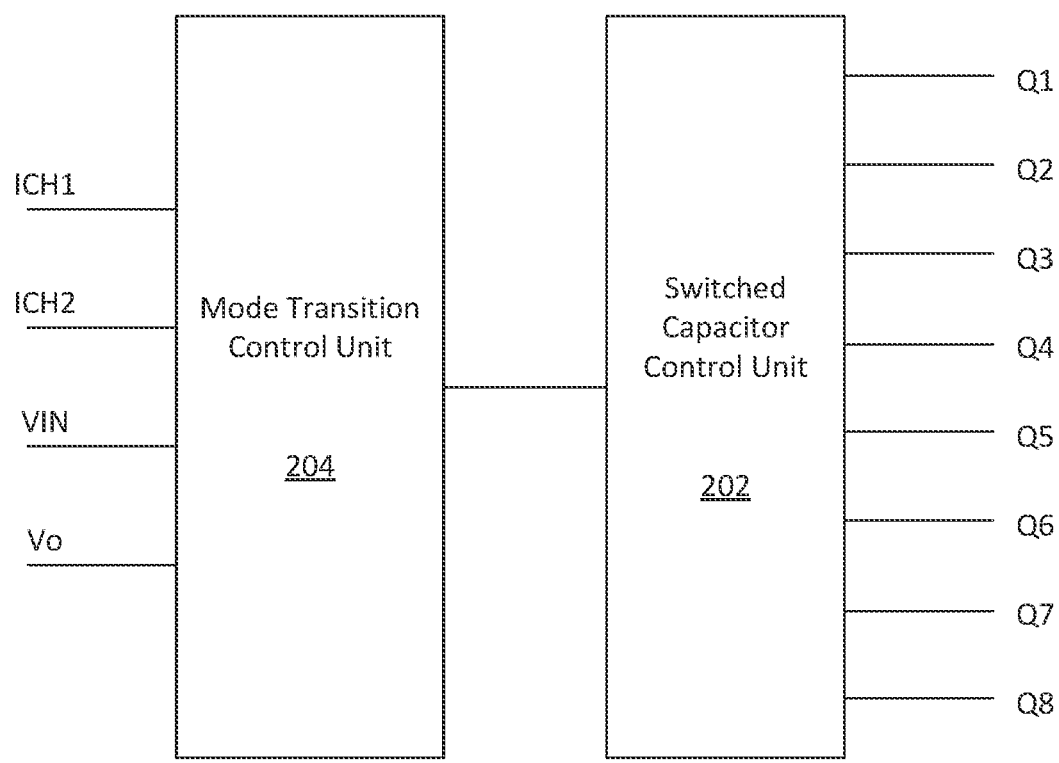
FIG. 2 illustrates a controller for driving the switches of the dual-phase switched capacitor power converter shown in FIG. 1 in accordance with various embodiments of the present disclosure.

FIG. 2 illustrates a controller for driving the switches of the dual-phase switched capacitor power converter shown in FIG. 1 in accordance with various embodiments of the present disclosure. The controller comprises a switched capacitor control unit 202 and a mode transition control unit 204. The mode transition control unit 204 is a mode transition control apparatus. The mode transition control unit 204 is configured to detect a plurality of operating parameters including a current ICH1 flowing through the first leg of the switched capacitor converter 100, a current ICH2 flowing through the second leg of the switched capacitor converter 100, the output voltage Vo and the input voltage VIN. Based on the detected operating parameters, the mode transition control unit 204 generates a mode transition command fed into the switched capacitor control unit 202. Based on the mode transition command, the switched capacitor control unit 202 changes the operating mode of the switched capacitor converter accordingly. The detailed structure and operating principle of the mode transition control unit 204 will be discussed below with respect to FIG. 3.

The switched capacitor control unit 202 comprises a plurality of gate drivers configured to generate a plurality of gate drive signals for driving the switched capacitor power converter. A first gate driver is configured to generate a first gate drive signal applied to the gate of Q1. A second gate driver is configured to generate a second gate drive signal applied to the gate of Q2. A third gate driver is configured to generate a third gate drive signal applied to the gate of Q3. A fourth gate driver is configured to generate a fourth gate drive signal applied to the gate of Q4. A fifth gate driver is configured to generate a fifth gate drive signal applied to the gate of Q5. A sixth gate driver is configured to generate a sixth gate drive signal applied to the gate of Q6. A seventh gate driver is configured to generate a seventh gate drive signal applied to the gate of Q7. An eighth gate driver is configured to generate an eighth gate drive signal applied to the gate of Q8.

The controller may further comprise a predetermined current sink. This current sink provides a sink current applied to the output voltage bus Vo. In other words, this current sink functions as a dummy load. In some embodiments, the current sink is about 50 mA. This current sink is enabled about 20 microseconds in every one millisecond for reducing unnecessary power losses. It should be noted that the numbers (50 mA and 20 microseconds) used in the previous example are selected purely for demonstration purposes and are not intended to limit the various embodiments of the present disclosure to any particular numbers.

Figure 3:
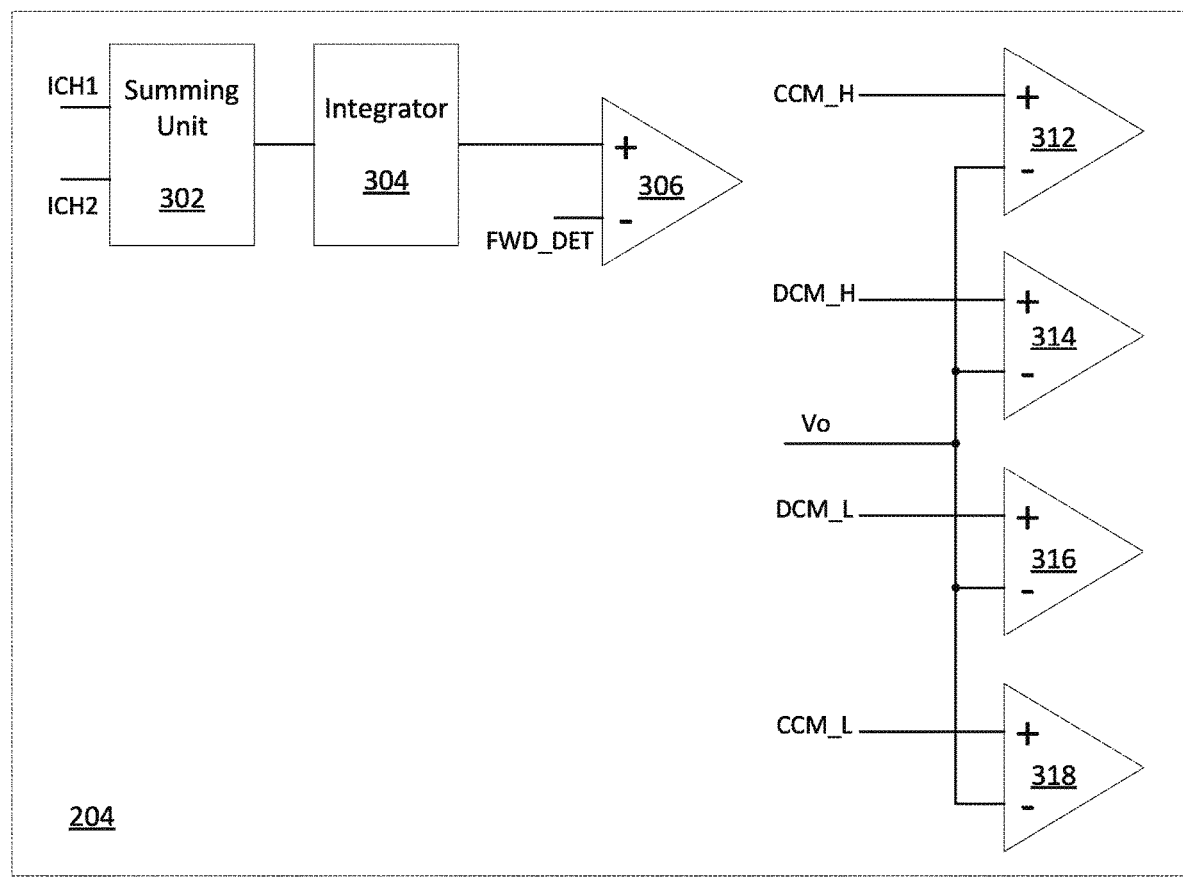
FIG. 3 illustrates a schematic diagram of the mode transition control unit shown in FIG. 2 in accordance with various embodiments of the present disclosure.

FIG. 3 illustrates a schematic diagram of the mode transition control unit shown in FIG. 2 in accordance with various embodiments of the present disclosure. The mode transition control unit 204 comprises a summing unit 302, an integrator 304 and a plurality of comparators 312, 314, 316, 318 and 306.

A first comparator 312 is configured to compare the output voltage Vo of the switched capacitor converter with CCM_H. In some embodiments, CCM_H is a first fixed PWM mode threshold voltage. Once Vo exceeds CCM_H, the first comparator 312 generates a command of configuring the switched capacitor converter to enter into the 1:2 fixed PWM mode.

A second comparator 314 is configured to compare the output voltage Vo of the switched capacitor converter with DCM_H. In some embodiments, DCM_H is a skip mode threshold voltage. Once Vo exceeds DCM_H, the second comparator 314 generates a command of configuring the switched capacitor converter to leave the 2:1 fixed PWM mode and enter into the 2:1 skip mode.

A third comparator 316 is configured to compare the output voltage Vo of the switched capacitor converter with DCM_L. In some embodiments, DCM_L is a threshold voltage for initializing a new cycle in the skip mode. Once Vo drops below DCM_L, the third comparator 316 generates a command of initializing a new cycle in the skip mode.

A fourth comparator 318 is configured to compare the output voltage Vo of the switched capacitor converter with CCM_L. In some embodiments, CCM_L is a second fixed PWM mode threshold voltage. The second fixed PWM mode threshold voltage is lower than the first fixed PWM mode threshold voltage. Once Vo drops below CCM_L, the fourth comparator 318 generates a command of configuring the switched capacitor converter to leave the 2:1 skip mode and enter into the 2:1 fixed PWM mode.

The current ICH1 of the first leg and the current ICH2 of the second leg are added together in the summing unit 302. The result generated by the summing unit 302 represents the current flowing through the switched capacitor converter 100. As shown in FIG. 3, the result of the summing unit 302 is fed into the integrator 304. The integrator 304 is employed to filter unwanted noise signals form the current signals (ICH1 and ICH2) and provide a suitable delay so that the switched capacitor converter 100 can reliably enter into the skip mode.

A fifth comparator 306 is configured to compare the current flowing through the switched capacitor converter with FWD_DET. In some embodiments, FWD_DET is a threshold for entering into the skip mode under a light load operating condition. As described above with respect to FIG. 2, a dummy load (e.g., 50 mA) produces a current flowing through the switched capacitor converter 100. By comparing the current flowing through the switched capacitor converter 100 with FWD_DET, the fifth comparator 306 is able to determine whether an external power source is available. More particularly, when the detected current is equal to the current of the dummy load, an external power source is not available. In response to this system configuration, the controller configures the switched capacitor converter 100 to leave the 1:2 fixed PWM mode and enter into the 2:1 skip mode.

It should be noted that the schematic diagram shown in FIG. 3 is merely an example, which should not unduly limit the scope of the claims. One of ordinary skill in the art would recognize many variations, alternatives, and modifications. For example, Vo may be compared with one half of VIN (VIN/2) directly. The difference between Vo and VIN/2 is compared with four thresholds. A first threshold is equal to the difference between CCM_H and VIN/2. The first threshold is used to determine whether the switched capacitor converter enters into the fixed PWM mode. A second threshold is equal to the difference between DCM_H and VIN/2. The second threshold is used to determine whether the switched capacitor converter enters into the skip mode. A third threshold is equal to the difference between DCM_L and VIN/2. The third threshold is used to initialize a new cycle in the skip mode. A fourth threshold is equal to the difference between CCM_L and VIN/2. The fourth threshold is used to determine whether the switched capacitor converter enters into the fixed PWM mode.

One advantageous feature of having the mode transition control unit 204 shown in FIG. 3 is that the switched capacitor converter 100 is able to have automatic transitions among different operating modes. In a conventional battery charging system, an application processor is employed to monitor the system operating parameters. Based on the detected parameters, the application processor sends an appropriate control signal to control the operating mode of the switched capacitor converter. The control configuration of the conventional battery charging system increases the complexity of the control system. Furthermore, due to the communication delays, the control signal from the application processor is not fast enough. The slow response may cause a slow mode transition from a skip mode to a fixed PWM mode. In the present disclosure, the mode transition control signal is generated within the controller. The mode transition command is directly applied to the gate drivers. The mode transition can be carried out automatically within the controller. Such a control configuration can simplify the system control design so as to have a seamless transition between different operating modes, thereby improving the mode transition reliability.

Figure 4:
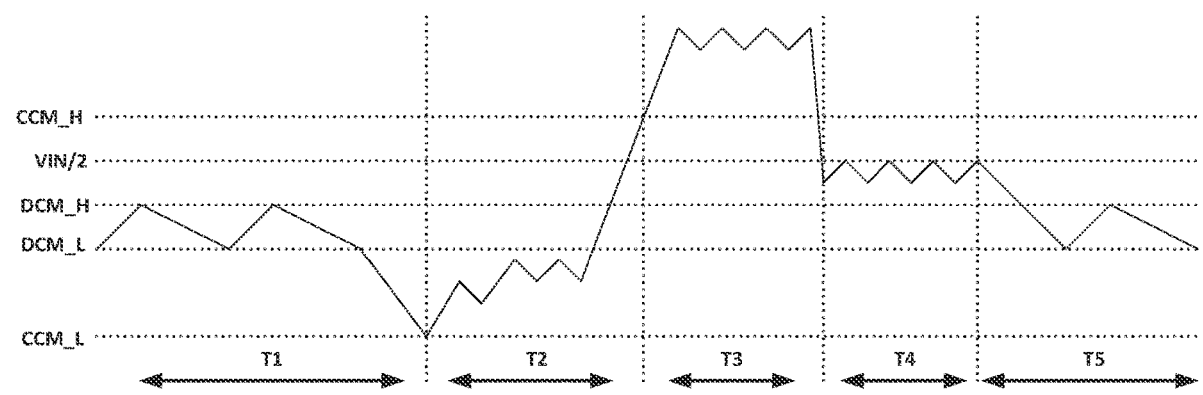
FIGS. 4-5 illustrate a timing diagram of controlling the dual-phase switched capacitor power converter operating in different operating modes in accordance with various embodiments of the present disclosure.
Figure 5:
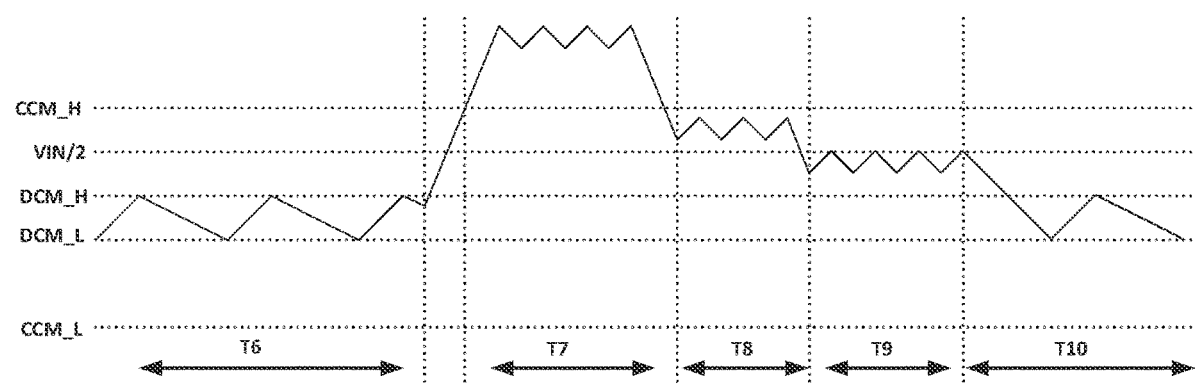

FIGS. 4-5 illustrate a timing diagram of controlling the dual-phase switched capacitor power converter operating in different operating modes in accordance with various embodiments of the present disclosure. The horizontal axis of FIGS. 4-5 represents intervals of time. There may be five dotted lines in FIGS. 4-5. The first dotted line represents a first voltage threshold CCM_H. In some embodiments, CCM_H is a first fixed PWM mode voltage threshold. The second dotted line represents one half of the input voltage (VIN/2). The third dotted line represents a second voltage threshold DCM_H. In some embodiments, DCM_H is a skip mode voltage threshold. The fourth dotted line represents a third voltage threshold DCM_L. In some embodiments, DCM_L is a voltage threshold for initializing a new cycle in the skip mode. The fifth dotted line represents a fourth voltage threshold CCM_L. In some embodiments, CCM_L is a second fixed PWM mode voltage threshold.

As shown in FIG. 4, the first voltage threshold CCM_H is higher than VIN/2. The second voltage threshold DCM_H is lower than VIN/2. The third voltage threshold DCM_L is lower than the second voltage threshold DCM_H. The fourth voltage threshold CCM_L is lower than the third voltage threshold DCM_L. It should be noted the four thresholds are not fixed. The values of these four thresholds may vary in proportion to the input voltage VIN.

In a first time duration T1, the switched capacitor power converter operates in the 2:1 skip mode. In response to a load increase, the output voltage Vo drops. Once Vo drops below the fourth voltage threshold CCM_L, the switched capacitor converter 100 is configured to leave the 2:1 skip mode and enter into the 2:1 fixed PWM mode.

In a second time duration T2, the switched capacitor converter operates in the 2:1 fixed PWM mode. When an ac/dc adapter is plugged in, the PMIC 102 starts to provide power for Vo. In response to this system configuration change, Vo increases in a linear manner at the end of T2 as shown in FIG. 4.

In a third time duration T3, once Vo exceeds the first voltage threshold CCM_H, the controller configures the switched capacitor converter 100 to leave the 2:1 fixed PWM mode and enter into the 1:2 fixed PWM mode. In the 1:2 fixed PWM mode, the switched capacitor converter 100 is configured to charge the battery.

At the end of T3, the PMIC 102 stops providing power for Vo. The output voltage Vo drops accordingly as shown in FIG. 4.

In the fourth time duration T4, the output voltage Vo stays at VIN/2. As described above, a current sink of about 50 mA is applied to the output of the switched capacitor converter 100. The controller is able to detect a current flowing from the input to the output of the switched capacitor converter. Upon detecting this current equal to a predetermined value (e.g., 50 mA), the controller configures the switched capacitor converter 100 to leave the 1:2 fixed PWM mode and enter into the skip mode at the end of T4. In the skip mode, since Vo is higher than DCM_H, the controller stops switching immediately.

In the fifth time duration T5, the output voltage Vo drops after the controller stops switching. Once the output voltage Vo reaches DCM_L, a new cycle starts as shown in FIG. 5.

In the sixth time duration T6, the switched capacitor converter operates in the 2:1 skip mode. At the end of T6, the ac/dc adapter is plugged in, and the PMIC 102 starts to provide power for Vo. In response to this system configuration change, Vo increases in a linear manner at the end of T6 and at the beginning of T7. Once Vo exceeds CCM_H, the controller configures the switched capacitor converter 100 to leave the 2:1 skip mode and enter into the 1:2 fixed PWM mode.

In the seventh time duration T7, the switched capacitor converter 100 operates in the 1:2 fixed PWM mode to charge the battery. In the eighth time duration T8, the battery is almost full. The current flowing from the PMIC 102 to the battery is reduced. In response to the reduced current, the voltage difference between Vo and VIN/2 has become smaller as shown in FIG. 5. It should be noted that before the battery is completely charged, the charge current is still flowing from Vo to VIN.

At the end of T8, the battery is fully charged. The output voltage Vo of the switched capacitor converter 100 stays at VIN/2 in the ninth time duration T9. As described above, a current sink of about 50 mA is applied to the output of the switched capacitor converter. The controller is able to detect a current flowing from the input to the output of the switched capacitor converter equal to the current from the current sink. Upon detecting this current, the controller configures the switched capacitor converter 100 to leave the 1:2 fixed PWM mode and enter into the skip mode at the beginning of the tenth time duration T10. In the skip mode, since Vo is higher than DCM_H, the controller stops switching immediately. In T10, once Vo drops to DCM_L, the controller initializes a new cycle to charge Vo.

Figure 6:
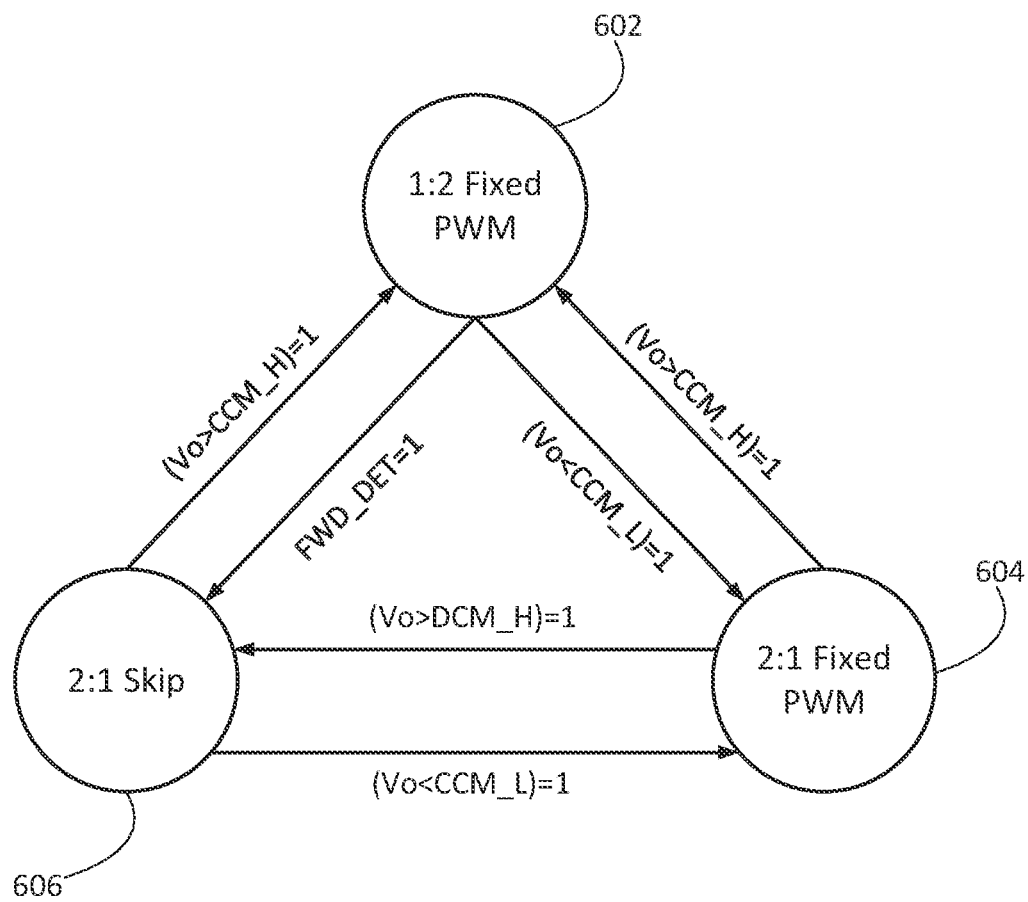
FIG. 6 illustrates a state machine for controlling the mode transition of the dual-phase switched capacitor power converter shown in FIG. 1 in accordance with various embodiments of the present disclosure.

FIG. 6 illustrates a state machine for controlling the mode transition of the dual-phase switched capacitor power converter shown in FIG. 1 in accordance with various embodiments of the present disclosure. The state machine includes three states, namely a 1:2 fixed PWM state 602, a 2:1 fixed PWM state 604 and a 2:1 skip state 606. The 1:2 fixed PWM state 602 corresponds to the 1:2 fixed PWM mode. The 2:1 fixed PWM state 604 corresponds to the 2:1 fixed PWM mode. The 2:1 skip state 606 corresponds to the 2:1 skip mode.

As used herein, the designation state machine is applied to a machine which can be in one of a number of states (e.g., states 602, 604 and 606), the machine being in one state at a time with the ability to change from one state to another (e.g., a transition) upon to a triggering event of condition. Such a state machine may thus be defined by its states and the triggering conditions for the transitions between two states. According to the state machine shown in FIG. 6, events leading to a transition from one state to another are indicated by arrows pointing to the new state starting from the old state as exemplified in FIG. 6.

The state machine shown in FIG. 6 allows state transitions between the 1:2 fixed PWM state 602 and the 2:1 fixed PWM state 604, between the 2:1 fixed PWM state 604 and the 2:1 skip state 606, and between the 2:1 skip state 606 and the 1:2 fixed PWM state 602.

Depending on the input voltage and the output voltage of the switched capacitor power converter, the controller (not shown but illustrated in FIG. 2) may determine the operating mode of the switched capacitor power converter 100. The controller generates a command of "1:2 fixed PWM" if the switched capacitor power converter 100 is ready for the 1:2 fixed PWM mode. Likewise, the controller generates a command of "2:1 fixed PWM" if the switched capacitor power converter 100 is ready for the 2:1 fixed PWM mode. Furthermore, the controller generates a command of "2:1 skip" if the switched capacitor power converter 100 is ready for the 2:1 skip mode.

In a mode transition from the 1:2 fixed PWM state 602 to the 2:1 fixed PWM state 604, the transition from state 602 to state 604 is triggered if the following conditions can be satisfied: Vo is less than the predetermined threshold CCM_L shown in FIGS. 5-6. The predetermined threshold CCM_L is a predetermined voltage. In some embodiments, the predetermined voltage (CCM_L) may vary in response to different input voltages. In a mode transition from the 2:1 fixed PWM state 604 to 1:2 fixed PWM state 602, the transition from state 604 to state 602 is triggered if the following conditions can be satisfied: Vo is greater than the predetermined threshold CCM_H shown in FIGS. 5-6. The predetermined threshold CCM_H is a predetermined voltage. In some embodiments, the predetermined voltage (CCM_H) may vary in response to different input voltages.

In a mode transition from the 2:1 fixed PWM state 604 to the 2:1 skip state 606, the transition from state 604 to state 606 is triggered if the following conditions can be satisfied: Vo is greater than the predetermined threshold DCM_H shown in FIGS. 5-6. The predetermined threshold DCM_H is a predetermined voltage. In some embodiments, the predetermined voltage (DCM_H) may vary in response to different input voltages. In a mode transition from the 2:1 skip state 606 to 2:1 fixed PWM state 604, the transition from state 606 to state 604 is triggered if the following conditions can be satisfied: Vo is less than the predetermined threshold CCM_L shown in FIGS. 5-6.

In a mode transition from the 2:1 skip state 606 to the 1:2 fixed PWM state 602, the transition from state 606 to state 602 is triggered if the following conditions can be satisfied: Vo is greater than the predetermined threshold CCM_H shown in FIGS. 5-6. In a mode transition from the 1:2 fixed PWM state 602 to the skip state 606, the transition from state 602 to state 606 is triggered if the following conditions can be satisfied: the controller detects a current flowing from the input to the output of the switched capacitor converter. The current is equal to the predetermined current sink (e.g., 50 mA).

Figure 7:
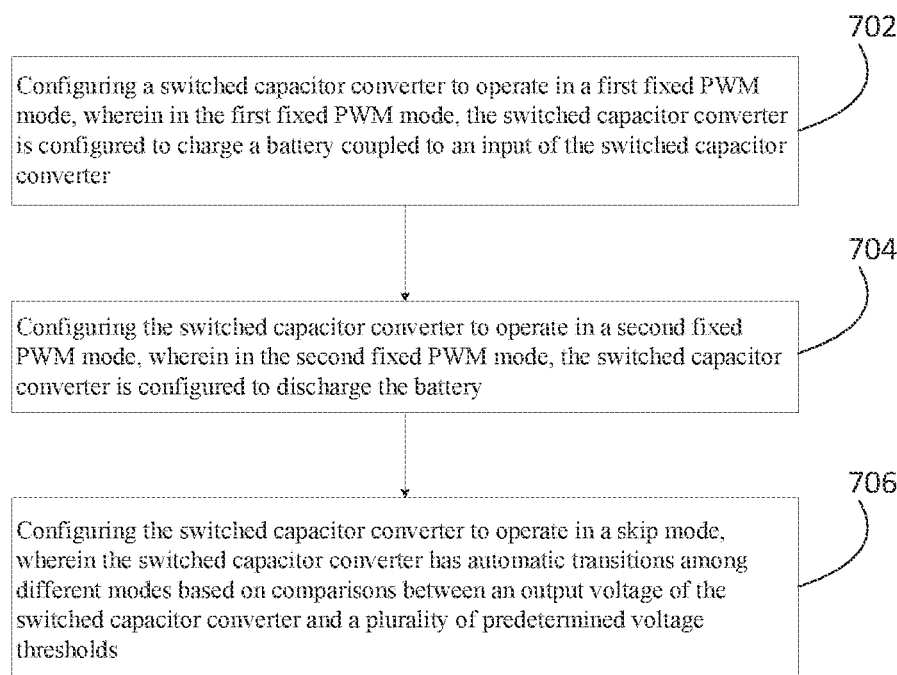
FIG. 7 illustrates a flow chart of controlling the battery charging system shown in FIG. 1 in accordance with various embodiments of the present disclosure.

FIG. 7 illustrates a flow chart of controlling the battery charging system shown in FIG. 1 in accordance with various embodiments of the present disclosure. This flowchart shown in FIG. 7 is merely an example, which should not unduly limit the scope of the claims. One of ordinary skill in the art would recognize many variations, alternatives, and modifications. For example, various steps illustrated in FIG. 7 may be added, removed, replaced, rearranged and repeated.

Referring back to FIG. 1, the switched capacitor power converter is a dual-phase switched capacitor converter. The input of the dual-phase switched capacitor converter is coupled to a battery such as a dual-cell battery. The output of the dual-phase switched capacitor converter is coupled to a PMIC as well as a system load.

At step 702, the switched capacitor converter is configured to operate in a first fixed PWM mode. In the first fixed PWM mode, the switched capacitor converter is configured to charge the battery coupled to the input of the switched capacitor converter.

At step 704, the switched capacitor converter is configured to operate in a second fixed PWM mode. In the second fixed PWM mode, the switched capacitor converter is configured to discharge the battery.

At step 706, the switched capacitor converter is configured to operate in a skip mode. The switched capacitor converter has automatic transitions among different modes based on comparisons between an output voltage of the switched capacitor converter and a plurality of predetermined voltage thresholds.

Referring back to FIG. 6 (from state 606 to state 604), the method further comprises configuring the switched capacitor converter to leave the skip mode and enter into the second fixed PWM mode after the output voltage the switched capacitor converter drops below the fourth voltage threshold. The second fixed PWM mode is a 2:1 fixed PWM mode, and the skip mode is a 2:1 skip mode.

Referring back to FIG. 6 (from state 604 to state 602), the method further comprises configuring the switched capacitor converter to leave the second fixed PWM mode and enter into the first fixed PWM mode after the output voltage the switched capacitor converter exceeds the first voltage threshold. The first fixed PWM mode is a 1:2 fixed PWM mode, and the second fixed PWM mode is a 2:1 fixed PWM mode.

Referring back to FIG. 6 (from state 606 to state 602), the method further comprises configuring the switched capacitor converter to leave the skip mode and enter into the first fixed PWM mode after the output voltage of the switched capacitor converter exceeds the first voltage threshold. The first fixed PWM mode is a 1:2 fixed PWM mode, and the skip mode is a 2:1 skip mode.

Referring back to FIG. 6 (from state 602 to state 604), the method further comprises configuring the switched capacitor converter to leave the first fixed PWM mode and enter into the second fixed PWM mode after the output voltage of the switched capacitor converter drops below the fourth voltage threshold. The first fixed PWM mode is a 1:2 fixed PWM mode, and the second fixed PWM mode is a 2:1 fixed PWM mode.

Referring back to FIG. 6 (from state 604 to state 606), the method further comprises configuring the switched capacitor converter to leave the second fixed PWM mode and enter into the skip mode after the output voltage of the switched capacitor converter exceeds the second voltage threshold. The second fixed PWM mode is a 2:1 fixed PWM mode, and the skip mode is a 2:1 skip mode.

Referring back to FIG. 6 (from state 602 to state 606), the method further comprises configuring the switched capacitor converter to leave the first fixed PWM mode and enter into the skip mode after the output voltage of the switched capacitor converter stays at one half of the input voltage and a current flowing through the switched capacitor converter is equal to a predetermined sink current. The first fixed PWM mode is a 1:2 fixed PWM mode and the skip mode is a 2:1 skip mode.

Referring back to T1 and T2 of FIG. 4, the method further comprises in response to a load current increase, configuring the switched capacitor converter to leave the 2:1 skip mode and enter into the 2:1 fixed PWM mode through comparing the output voltage of the switched capacitor converter with a first fixed PWM mode voltage threshold. The first fixed PWM mode voltage threshold is less than one half of an input voltage of the switched capacitor converter.

Referring back to T2 and T3 of FIG. 4, the method further comprises after the charger starts to provide power for the output of the switched capacitor converter, configuring the switched capacitor converter to leave the 2:1 fixed PWM mode and enter into the 1:2 fixed PWM mode through comparing the output voltage of the switched capacitor converter with a second fixed PWM mode voltage threshold. The second fixed PWM mode voltage threshold is greater than one half of an input voltage of the switched capacitor converter.

Referring back to T4 and T5 of FIG. 4, the method further comprises after the charger stops providing power for the output of the switched capacitor converter and the output voltage of the switched capacitor converter stays at one half of an input voltage of the switched capacitor converter, configuring the switched capacitor converter to leave the 1:2 fixed PWM mode and enter into the 2:1 skip mode upon detecting that a current flowing through the switched capacitor converter is equal to a predetermined sink current.

Referring back to T6, T7 and T8 of FIG. 5, the method further comprises after the charger starts to provide power for the output of the switched capacitor converter, configuring the switched capacitor converter to leave the 2:1 skip mode and enter into the 1:2 fixed PWM mode through comparing the output voltage of the switched capacitor converter with a second fixed PWM mode voltage threshold. The second fixed PWM mode voltage threshold is greater than one half of an input voltage of the switched capacitor converter.

Referring back to T9 and T10 of FIG. 5, the method further comprises after the battery has been fully charged and the output voltage of the switched capacitor converter stays at one half of an input voltage of the switched capacitor converter, configuring the switched capacitor converter to leave the 1:2 fixed PWM mode and enter into the 2:1 skip mode upon detecting that a current flowing through the switched capacitor converter is equal to a predetermined sink current.

Although embodiments of the present disclosure and its advantages have been described in detail, it should be understood that various changes, substitutions and alterations can be made herein without departing from the spirit and scope of the disclosure as defined by the appended claims.

Moreover, the scope of the present application is not intended to be limited to the particular embodiments of the process, machine, manufacture, composition of matter, means, methods and steps described in the specification. As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:

1. A method comprising:
    configuring a switched capacitor converter to operate in a first fixed PWM mode, wherein in the first fixed PWM mode, the switched capacitor converter is configured to charge a battery coupled to an input of the switched capacitor converter;
    configuring the switched capacitor converter to operate in a second fixed PWM mode, wherein in the second fixed PWM mode, the switched capacitor converter is configured to discharge the battery; and
    configuring the switched capacitor converter to operate in a skip mode, wherein the switched capacitor converter has automatic transitions among different modes based on comparisons between an output voltage of the switched capacitor converter and a plurality of predetermined voltage thresholds.

2. The method of claim 1, wherein:
    the first fixed PWM mode is a 1:2 fixed PWM mode;
    the second fixed PWM mode is a 2:1 fixed PWM mode; and
    the skip mode is a 2:1 skip mode.

3. The method of claim 1, wherein the switched capacitor converter comprises:
    a first switch, a second switch, a third switch and a fourth switch connected in series between the input of the switched capacitor converter and ground;
    a first flying capacitor connected between a common node of the first switch and the second switch, and a common node of the third switch and the fourth switch;
    a fifth switch, a sixth switch, a seventh switch and an eighth switch connected in series between the input of the switched capacitor converter and ground; and
    a second flying capacitor connected between a common node of the fifth switch and the sixth switch, and a common node of the seventh switch and the eighth switch, and wherein the common node of the second switch and the third switch is connected to a common node of the sixth switch and the seventh switch, and further connected to an output of the switched capacitor converter.

4. The method of claim 1, wherein the plurality of predetermined voltage thresholds comprises:
    a first voltage threshold higher than one half of an input voltage of the switched capacitor converter;
    a second voltage threshold lower than the one half of the input voltage of the switched capacitor converter;
    a third voltage threshold lower than the second voltage threshold; and
    a fourth voltage threshold lower than the third voltage threshold.

5. The method of claim 4, further comprising:
    configuring the switched capacitor converter to leave the skip mode and enter into the second fixed PWM mode after the output voltage the switched capacitor converter drops below the fourth voltage threshold, wherein the second fixed PWM mode is a 2:1 fixed PWM mode and the skip mode is a 2:1 skip mode.

6. The method of claim 4, further comprising:
    configuring the switched capacitor converter to leave the second fixed PWM mode and enter into the first fixed PWM mode after the output voltage the switched capacitor converter exceeds the first voltage threshold, wherein the first fixed PWM mode is a 1:2 fixed PWM mode, and the second fixed PWM mode is a 2:1 fixed PWM mode.

7. The method of claim 4, further comprising:
    configuring the switched capacitor converter to leave the skip mode and enter into the first fixed PWM mode after the output voltage of the switched capacitor converter exceeds the first voltage threshold, wherein the first fixed PWM mode is a 1:2 fixed PWM mode and the skip mode is a 2:1 skip mode.

8. The method of claim 4, further comprising:
    configuring the switched capacitor converter to leave the first fixed PWM mode and enter into the second fixed PWM mode after the output voltage of the switched capacitor converter drops below the fourth voltage threshold, wherein the first fixed PWM mode is a 1:2 fixed PWM mode, and the second fixed PWM mode is a 2:1 fixed PWM mode.

9. The method of claim 4, further comprising:
    configuring the switched capacitor converter to leave the second fixed PWM mode and enter into the skip mode after the output voltage of the switched capacitor converter exceeds the second voltage threshold, wherein the second fixed PWM mode is a 2:1 fixed PWM mode and the skip mode is a 2:1 skip mode.

10. The method of claim 4, further comprising:
    configuring the switched capacitor converter to leave the first fixed PWM mode and enter into the skip mode after the output voltage of the switched capacitor converter stays at one half of the input voltage and a current flowing through the switched capacitor converter is equal to a predetermined sink current, wherein the first fixed PWM mode is a 1:2 fixed PWM mode and the skip mode is a 2:1 skip mode.

11. A method comprising:
    coupling an input of a switched capacitor power converter to a battery and an output of the switched capacitor power converter to a system load and a charger;
    configuring the switched capacitor converter to operate in a 1:2 fixed PWM mode to charge the battery;
    configuring the switched capacitor converter to operate in a 2:1 fixed PWM mode to discharge the battery; and configuring the switched capacitor converter to operate in a 2:1 skip mode in a light load operating condition, wherein the switched capacitor converter has automatic transitions among different modes based on comparisons between an output voltage of the switched capacitor converter and a plurality of predetermined voltage thresholds.

12. The method of claim 11, further comprising:
in response to a load current increase, configuring the switched capacitor converter to leave the 2:1 skip mode and enter into the 2:1 fixed PWM mode through comparing the output voltage of the switched capacitor converter with a first fixed PWM mode voltage threshold, wherein the first fixed PWM mode voltage threshold is less than one half of an input voltage of the switched capacitor converter.

13. The method of claim 11, further comprising:
after the charger starts to provide power for the output of the switched capacitor converter, configuring the switched capacitor converter to leave the 2:1 fixed PWM mode and enter into the 1:2 fixed PWM mode through comparing the output voltage of the switched capacitor converter with a second fixed PWM mode voltage threshold, wherein the second fixed PWM mode voltage threshold is greater than one half of an input voltage of the switched capacitor converter.

14. The method of claim 11, further comprising:
after the charger stops providing power for the output of the switched capacitor converter and the output voltage of the switched capacitor converter stays at one half of an input voltage of the switched capacitor converter, configuring the switched capacitor converter to leave the 1:2 fixed PWM mode and enter into the 2:1 skip mode upon detecting that a current flowing through the switched capacitor converter is equal to a predetermined sink current.

15. The method of claim 11, further comprising:
after the charger starts to provide power for the output of the switched capacitor converter, configuring the switched capacitor converter to leave the 2:1 skip mode and enter into the 1:2 fixed PWM mode through comparing the output voltage of the switched capacitor converter with a second fixed PWM mode voltage threshold, wherein the second fixed PWM mode voltage threshold is greater than one half of an input voltage of the switched capacitor converter.

16. The method of claim 11, further comprising:
after the battery has been fully charged and the output voltage of the switched capacitor converter stays at one half of an input voltage of the switched capacitor converter, configuring the switched capacitor converter to leave the 1:2 fixed PWM mode and enter into the 2:1 skip mode upon detecting that a current flowing through the switched capacitor converter is equal to a predetermined sink current.

17. A controller comprising:
a first comparator configured to compare an output voltage of a switched capacitor power converter with a first fixed PWM mode threshold voltage, wherein the first fixed PWM mode threshold voltage is greater than one half of an input voltage of the switched capacitor power converter;
a second comparator configured to compare the output voltage of the switched capacitor power converter with a skip mode threshold voltage;
a third comparator configured to compare the output voltage of the switched capacitor power converter with a threshold voltage for initializing a skip mode;
a fourth comparator configured to compare the output voltage of a switched capacitor power converter with a second fixed PWM mode threshold voltage, wherein the second fixed PWM mode threshold voltage is less than the one half of an input voltage of the switched capacitor power converter; and
a fifth comparator configured to compare a current flowing through the switched capacitor power converter with a predetermined sink current for determining whether the switched capacitor power converter enters into the skip mode under a light load operating condition.

18. The controller of claim 17, further comprising:
a plurality of gate drivers configured to generate a plurality of gate drive signals for driving the switched capacitor power converter, wherein output results of the first comparator, the second comparator, the third comparator, the fourth comparator and the fifth comparator are used to determine operating modes of the switched capacitor power converter.

19. The controller of claim 17, wherein the switched capacitor converter comprises:
a first switch, a second switch, a third switch and a fourth switch connected in series between an input of the switched capacitor converter and ground;
the first flying capacitor connected between a common node of the first switch and the second switch, and a common node of the third switch and the fourth switch;
a fifth switch, a sixth switch, a seventh switch and an eighth switch connected in series between the input of the switched capacitor converter and ground; and
a second flying capacitor connected between a common node of the fifth switch and the sixth switch, and a common node of the seventh switch and the eighth switch, and wherein the common node of the second switch and the third switch is connected to a common node of the sixth switch and the seventh switch, and further connected to an output of the switched capacitor converter.

20. The controller of claim 17, wherein:
after the output voltage of the switched capacitor power converter exceeds the first fixed PWM mode threshold voltage, the switched capacitor power converter is configured to operate in a 1:2 fixed PWM mode;
after the output voltage of the switched capacitor power converter drops below the second fixed PWM mode threshold voltage, the switched capacitor power converter is configured to operate in a 2:1 fixed PWM mode; and
after finding the light load operating condition, the switched capacitor power converter is configured to operate in a 2:1 skip mode.

* * * * *